United States Patent
Ail et al.

(10) Patent No.: US 8,826,017 B2
(45) Date of Patent: Sep. 2, 2014

(54) OPTIMIZING WEB LANDING PAGE LINK ACCESS TIMES THROUGH PRELIMINARY FUNCTIONS DURING PAGE DEPLOYMENT

(75) Inventors: Roshan C Ail, Austin, TX (US); Rohit F Colaco, Belmont, CA (US); Yang Zhong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/269,793

(22) Filed: Oct. 10, 2011

(65) Prior Publication Data

US 2013/0091356 A1     Apr. 11, 2013

(51) Int. Cl.
*H04L 9/32*     (2006.01)

(52) U.S. Cl.
USPC .......................................................... 713/168

(58) Field of Classification Search
USPC .......................................................... 713/168
See application file for complete search history.

(56) References Cited

U.S. PATENT DOCUMENTS

| | | | |
|---|---|---|---|
| 6,115,699 A * | 9/2000 | Hardjono | 705/51 |
| 6,606,653 B1 * | 8/2003 | Ackermann et al. | 709/219 |
| 2002/0046281 A1 | 4/2002 | Cope | |
| 2007/0083671 A1 | 4/2007 | Linn et al. | |
| 2007/0260705 A1 | 11/2007 | Armstrong et al. | |
| 2007/0291739 A1 | 12/2007 | Sullivan et al. | |
| 2009/0183000 A1 * | 7/2009 | Krig | 713/168 |
| 2011/0071997 A1 | 3/2011 | Sullivan et al. | |
| 2011/0145435 A1 | 6/2011 | Bhatawdekar et al. | |
| 2012/0163598 A1 * | 6/2012 | Wang et al. | 380/259 |

* cited by examiner

*Primary Examiner* — Mohammad W Reza
(74) *Attorney, Agent, or Firm* — J. B. Kraft; P. T. Kalatzis

(57) ABSTRACT

Making redirection from links selected in the landing page to a selected page to a selected page or site more effective and faster by performing functions at the Web site providing the landing page during the deployment of the landing page.

15 Claims, 3 Drawing Sheets

OPTIMIZING WEB LANDING PAGE LINK ACCESS TIMES THROUGH PRELIMINARY FUNCTIONS DURING PAGE DEPLOYMENT

TECHNICAL FIELD

The present invention relates to the business conducted via the World Wide Web (Web), e.g. eBusiness, Internet marketing or search marketing and, more particularly, to the creation and deployment of Web pages with hypertext links. The invention is especially concerned with improving the effectiveness of landing pages that may be described as Web pages that are transmitted from a business source when a potential customer clicks on a displayed link that is in a Web advertisement or in a list of links in a search engine output.

BACKGROUND OF RELATED ART

The Internet business industry is continuously striving to optimize the speed and effectiveness of landing pages. Potential customers are linked through the landing page to a point of potential product sale. A great concern in Internet marketing is the optimization of the conversion rate, i.e. the percentage of visitors to the source landing page who are converted to customers.

A great factor in improving the conversion rate is the speed in which the potential customers get from the selected link in the landing page to the product or sales point in a resulting page. Typical Internet customers are often annoyed by time consumed in finding a vendor and reaching the vendor sales point. Customers will often back down from a selected vendor's landing page if the response from a selected link is slow, and then select another vendor from the search list. Consequently, the industry is continuously seeking methods for improving the speed of access from a selected link in the landing page.

A landing page is created at and deployed from a source on the Web and is sent to a data processor controlled requesting display via the Web. A potential customer on the Web may have clicked on a link in a displayed advertisement, requesting email or, even more often, a link on a search result list of vendors for the product the customer is seeking. It should be understood that the speed of redirection or access to other pages from selected links in the landing page results in user/customer impatience wherein the customer stops waiting and selects another landing page from another vendor.

SUMMARY OF THE PRESENT INVENTION

The present invention is also directed to making redirection from links selected in the landing page to a selected page or site more effective and faster by performing functions at the Web site during the deployment of the landing page. Accordingly, the present invention provides a method for increasing the speed of redirection of the landing page comprising deploying a landing page from the source site to a requesting display station and decrypting a plurality of encrypted elements in the landing page during the deployment of said landing page, wherein the elements are decrypted when the landing page is received at the requesting display station. Thus, such decrypting does not have to be done at run-time when the user or potential customer is selecting links on the landing page and consequential redirection.

On the other hand, should there be any further encoding necessary for redirection, according to the method of the present invention, such further encoding may be done during deployment of the landing page at the source so that such encoding need not be done at run-time.

The present invention further updates a set of parameters of the landing page with parameters provided from the requesting station or replaces all of the set of parameters of the landing page with parameters provided from the requesting page during the deployment of the landing page.

In accordance with another aspect of this invention, a sequence of undecoded URLs of Web pages that may be subsequently selected nested within the URL of the landing page wherein the undecoded nested URLs need no further run-time decryption from the initial received landing page.

BRIEF DESCRIPTION OF THE DRAWINGS

The present invention and it's numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
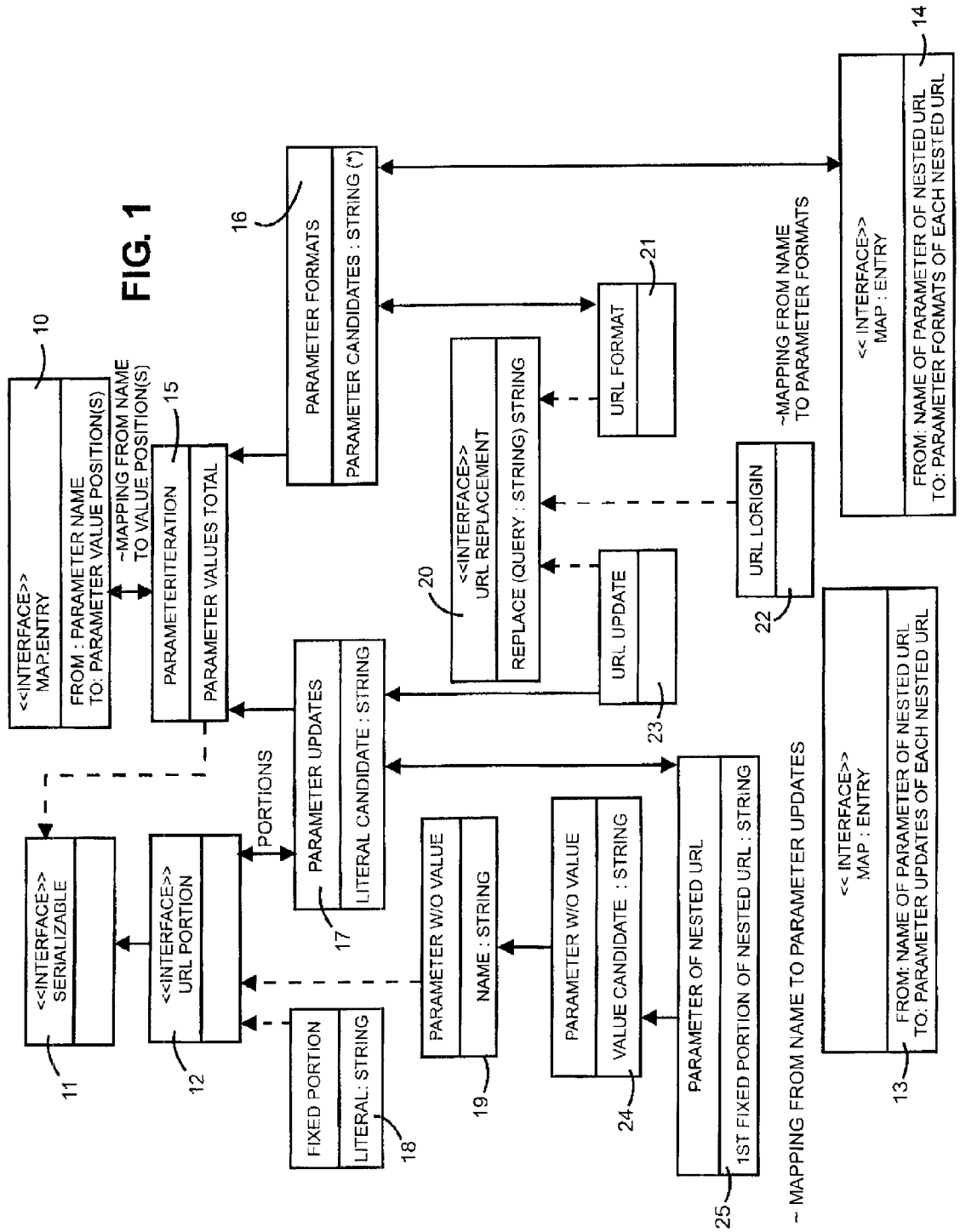
FIG. 1 is a flowchart illustrating the relationships between the functions of the present invention that are performed at the Web site providing the landing page during the deployment of the landing page.

Referring to FIG. 1, there is shown a generalized diagrammatic view of a flow chart of a method that computes as much as possible during deployment, wherein as little as possible is left to be done at the run-time of the requested landing page after the page has arrived at the requesting display station. Firstly, run-time decryption of the URLs of the links in the landing page can be eliminated if, during deployment, the identifiers in each link URL in the landing page are encrypted at the Web page data source using a standard and consistent algorithm, e.g. algorithm/mode/padding, the output of which does not vary, and further encodes the binary from the encryption, again by using consistent padding, the output cannot vary too much. Also, during deployment of the landing page, the encoded encryption of identifiers to the URLs in the landing page is used to thereby eliminate run-time decoding and decryption.

With reference to FIG. 1, URL (link) candidates in a landing page may be parsed during page deployment according to the data structure illustrated. At an appropriate interface, there is mapping from the Parameter Name to Parameter Value Positions, 10. There is parameter iteration until total parameters are reached, 15. Redirection during deployment is achieved in three ways: A) recursive updating of URLs in the landing page being deployed via input 23 through parameter update 17 via URL portion interface 12. The fixed portion of the update is provided via input 18 to interface 12. B) recursive replacing of all existing parameters of a URL candidate in a landing page with requesting ones via URL format input 21 through format 16. It is noted that both parameter update 17 and format 16 are also subjected to parameter iteration 15 as described hereinabove. In addition, C) an original URL candidate in the landing page being deployed could be used in original form despite requesting parameters, e.g. URLorigin via input 22 directly to URL replacement interface 20. Since URL format 21 and URLupdate 23 are also applied to URL replacement Interface, at run-time of the received landing page at the requesting display station, URL replacement may be invoked to redirect the URL in the landing page.

Now in dealing with nested URL candidates in a landing page, i.e. URL candidate nested in other URL candidates, input from the nested URL candidates are respectively mapped through interfaces 13 and 14 to ParameterUpdates 17 and ParameterFormats 16, and are also subjected to parameter iteration 15, described hereinabove that maps parameter names to parameter value positions. URLupdate 23 and URLformat 21 represent the root URL candidate, while they are respectively instances of URL ParameterUpdates 17 and ParameterFormats 16 as well. In addition, ParameterUpdates 17 tracks all URL portions including fixed literal portions 18, as well as nested fixed portions 25 including parameters that never show up in the requesting URL. URL parameters with 24 and URL parameters without 19 value that can be nested URLs.

All parts of the data structure shown in FIG. 1 are serializable 11, and there savable as and loadable from local files for high performance encryption, encoding and parsing, particularly accessing data source. The above-described method may achieve parsing of nested URLs without URL decoding.

Figure 2:
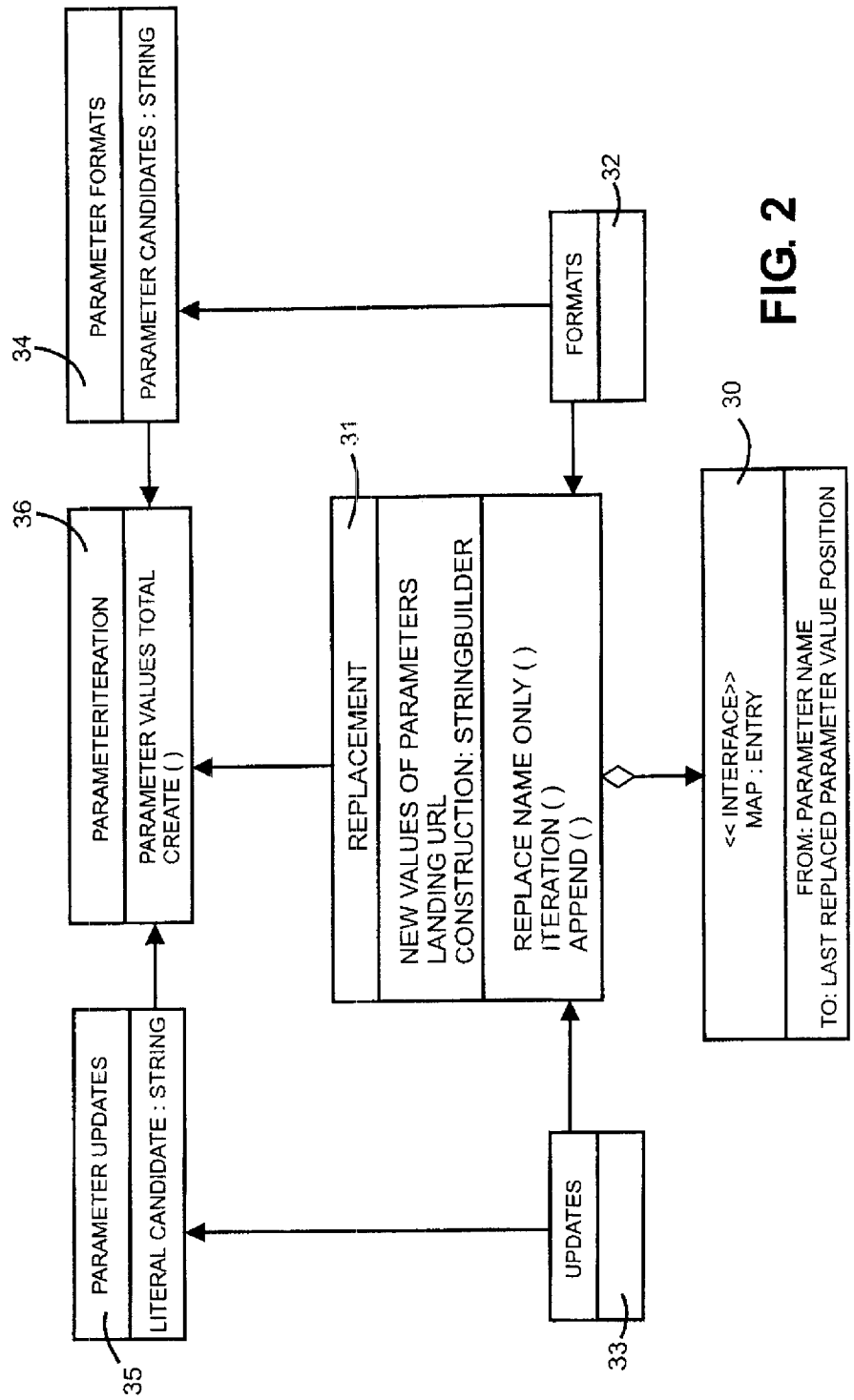
FIG. 2 is a flowchart illustrating the performance of functions with respect to the landing page subsequent to the receiving of a landing page at a requesting display station.

Now with respect to FIG. 2, there will be described the performance of functions with respect to the landing page subsequent to the receiving of a landing page at a requesting display station, i.e. run-time of the landing page including the update of parameters in the landing page.

The Parameterinteration 36 represents the values of parameters as developed as Parameterinteration 15 in FIG. 1, and ParameterUpdates 35 and ParameterFormats 34 correspond to functions 17 and 16 developed in the structure of FIG. 1. The functions at run-time, FIG. 2, are optimized to minimize response times. Response to redirection requests in which URL replacement is looked up in Replacement 31, each instant is looked up by the identifying portion of the requesting URL without any decoding, decryption, retrieval from data source or recursive parsing. Thus, the Replace function is invoked directly to Replacement function 31 with a URL query to redirect a landing page URL. For instances of URL update and URL format, Updates 33 and Formats 32 are created to recursively update (nested) landing page URL parameters. Both Updates 33 and Formats 32 are instances of Replacement 31 that parse (nested) requesting URLs without any URL decoding and the parameter value is replaced into the landing URL.

Parameterinteration 36, as well as ParameterUpdates 35 and ParameterFormats 34, are consulted to make instantaneous determinations such as Parameter Values Total to initiate the New Values of Parameters in Replacement 31. Other expedited functions are mapping from NameToValuePositions to simply append a non-mapped parameter along with its value to Landing URL construction StringBuilder in Replacement 31. A function stores new value to the next position of the mapped parameter and tracks that position within mapping From NameToLastReplacedValuePosition 30. Mapping may be done FromNameToParameterUpdates 35 or FromNameToParameterFormats 34 to recursively replace nested URL parameters while iteration in Replacement 31 is being invoked. After the requesting URL has been parsed, new values have been stored correspondingly, the landing URLs are constructed by using the same order of parameters as the landing page URL candidate with any new values from the requesting URL without any URL encoding.

With this described method including the preparation during deployment of the landing page, run-time redirection is very effectively performed and deployment hardware requirements are lowered since each method instance processes an increased number of requests.

Figure 3:
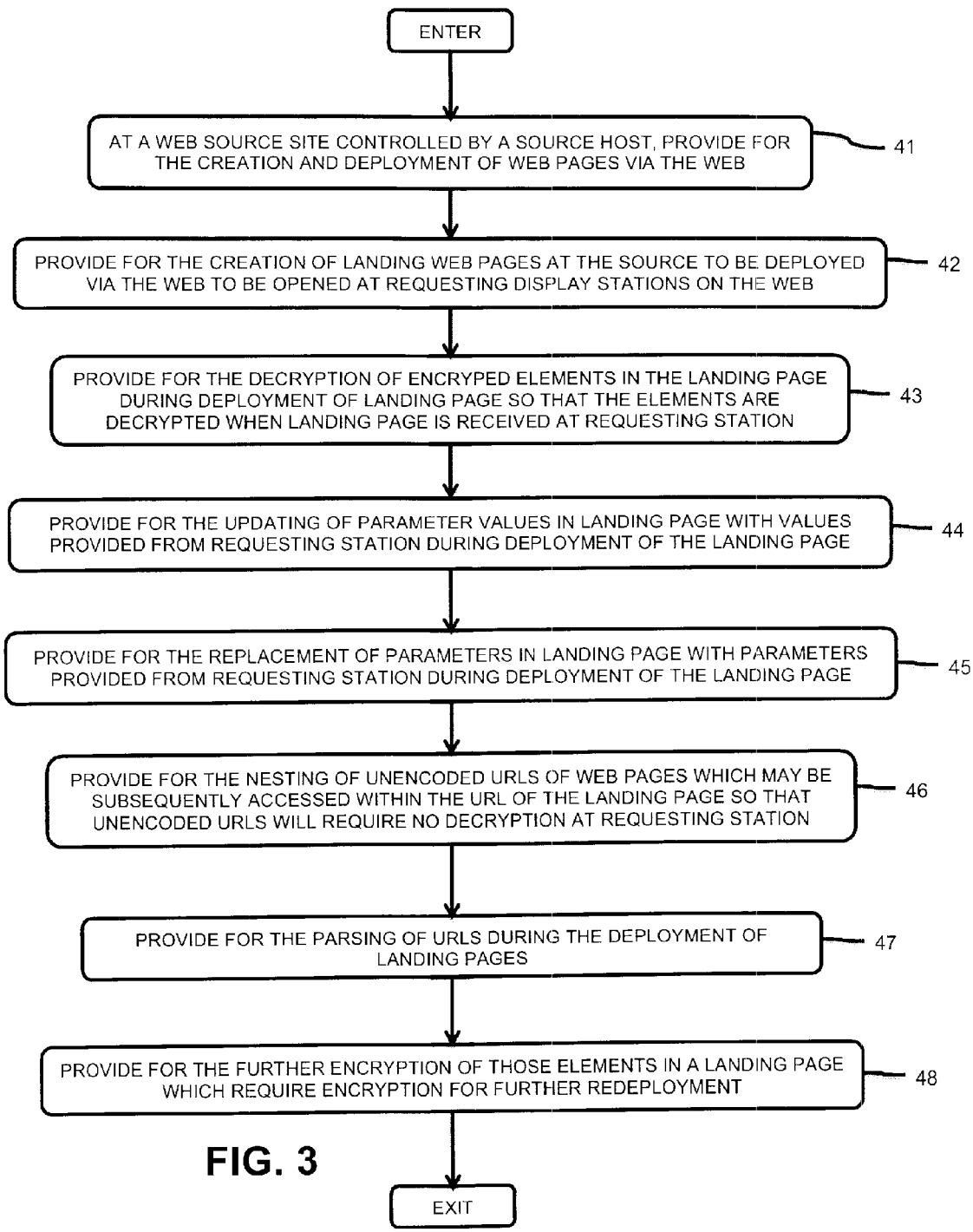
FIG. 3 is a general flowchart of a program set up to implement the present invention for the performance of functions during deployment before the accessed landing page is received at the requesting display station.

FIG. 3 is a general flowchart of an illustrative program set up to implement the present invention for increasing the speed of redirection in landing pages.

Provision is made for the creating and deployment of Web pages via the Web from Web sources controlled by a host, 41. Provision is made for the creation of a Web page at a Web source to be deployed via the Web and opened at requesting display stations on the Web, 42.

Provision is made for the decryption of encrypted elements in the landing page during deployment of the page so that the elements are decrypted when the landing page is received at the requesting station, 43.

Provision is made for the updating of parameter values in the landing page with parameters provided from the requesting station during deployment of the landing page, 44. Provision is made for the replacement of parameters in the landing page with parameters provided from the requesting station during deployment of the landing page, 45. Provision is made for the nesting of unencoded URLs of Web pages that may be subsequently accessed within the URL of a landing page so that such unencoded URLs will require no decryption at the requesting station, 46

Provision is made for the parsing of URLs during the deployment of landing pages, 47. Also, provision is made for the further encryption of those elements in a landing page that require encryption for further redeployment.

As will be appreciated by one skilled in the art, aspects of the present invention may be embodied as a system, method or computer program product. Accordingly, aspects of the present invention may take the form of an entirely hardware embodiment, an entirely software embodiment, including firmware, resident software, micro-code, etc.; or an embodiment combining software and hardware aspects that may all generally be referred to herein as a "circuit", "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a Random Access Memory ("RAM"), a Read Only Memory ("ROM"), an Erasable Programmable Read Only Memory ("EPROM" or Flash memory), an optical fiber, a portable compact disc read only memory ("CD-ROM"), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including, but not limited to, wireless, wire line, optical fiber cable, RF, etc., or any suitable combination the foregoing.

Computer program code for carrying out operations for aspects of the present invention may be written in any combination of one or more programming languages, including an object oriented programming language, such as Java, Smalltalk, C++ and the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the later scenario, the remote computer may be connected to the user's computer through any type of network, including a local area network ("LAN") or a wide area network ("WAN"), or the connection may be made to an external computer (for example, through the Internet, using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that instructions, which execute via the processor of the computer or other programmable data processing apparatus, create means for implementing the functions/acts specified flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the Figures illustrate the architecture, functionality and operations of possible implementations of systems, methods and computer program products according to various embodiments of the present invention. In this regard, each block in the flowchart or block diagrams may represent a module segment, or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations can be implemented by special purpose hardware-based systems that perform the specified functions or acts, or combinations of special purpose hardware and computer instructions.

Although certain preferred embodiments have been shown and described, it will be understood that many changes and modifications may be made therein without departing from the scope and intent of the appended claims.

What is claimed is:

1. In a World Wide Web (Web) communication network with user access via a plurality of data processor controlled interactive receiving display stations for displaying received hypertext landing pages generated at source sites on the Web, a method for increasing the speed of redirection of the landing page comprising:
deploying a landing page from the, source site to a requesting display station;
decrypting a plurality of encrypted elements in said landing page during said deploying of said landing page, wherein said elements are decrypted when said landing page is received at said requesting display station;
updating a set of URL parameters in said landing page with URL parameters provided from said requesting station before said landing page is received at said requesting display station; and
replacing all parameters of said landing page with parameters provided from said requesting station before said landing page is received at said requesting display station, wherein said landing page is reformatted when received at said requesting display station.

2. The method of claim 1, further including encrypting, during said deploying, other elements in said landing page requiring encryption for further redeployment.

3. The method of claim 1, wherein said landing page includes unencoded URLs of Web pages to be subsequently selected for access nested within the URL of the landing page, wherein said nested URLs in said landing page do not require decryption.

4. The method of claim 1, further including encrypting said plurality of encrypted elements in said landing page with consistent algorithm/mode/padding.

5. The method of claim 1, further including parsing of URLs in the landing page during deployment of said landing page.

6. In a World Wide Web (Web) communication network with user access via a plurality of data processor controlled interactive receiving display stations for displaying received hypertext landing pages generated at source sites on the Web, a system for increasing the speed of redirection of the landing page comprising:
a processor; and
a computer memory holding computer program instructions which when executed by the processor perform the method comprising:
deploying a landing page, from the source site to a requesting display station;

decrypting a plurality of encrypted elements in said landing page during said deploying of said landing page, wherein said elements are decrypted when said landing page is received at said requesting display station;

updating a set of URL parameters in said landing page with URL parameters provided from said requesting station before said landing page is received at said requesting display station; and replacing all parameters of said landing page with parameters provided from said requesting station before said landing page is received at said requesting display station, wherein said landing page is reformatted when received at said requesting display station.

7. The system of claim 6, wherein said performed method further includes encrypting, during said deployment, other elements in said landing page requiring encryption for further redeployment.

8. The system of claim 6, wherein said landing page includes unencoded URLs of Web pages to be subsequently selected for access nested within the URL of the landing page, wherein said nested URL in said landing page do not require decryption.

9. The system of claim 6, wherein said method further includes encrypting said plurality of encrypted elements in said landing page with consistent algorithm/mode/padding.

10. The system of claim 6, wherein said method further includes parsing of URLs in the landing page during deploying of said landing page.

11. A non-transitory computer usable storage medium having stored thereon a computer readable program for increasing the speed of redirection of the landing page in a World Wide Web (Web) communication network with user access via a plurality of data processor controlled interactive receiving display stations for displaying received hypertext landing pages generated at source sites on the Web, wherein the computer readable program when executed on a computer causes the computer to:

deploy a landing page from the source site to a requesting display station;

decrypt a plurality of encrypted elements in said landing page before said landing page is received at said requesting display station, wherein said elements are decrypted when said landing page is received at said requesting display station;

update a set of URL parameters in said landing page with URL parameters provided from said requesting station before said landing page is received at said requesting display station; and replace all parameters of said landing page with parameters provided from said requesting station page before said landing page is received at said requesting display station, wherein said landing page is reformatted when received at said requesting display station.

12. The computer readable medium of claim 11, wherein the computer program when executed further causes the computer to encrypt, during said deploying, other elements in said landing page requiring encryption for further redeployment.

13. The computer readable medium of claim 11, wherein said landing page includes unencoded URLs of Web pages to be subsequently selected for access nested within the URL of the landing page, wherein said nested URLs in said landing page do not require decryption.

14. The computer readable medium of claim 11, wherein the computer program when executed further causes the computer to encrypt said plurality of encrypted elements in said landing page with consistent algorithm/mode/padding.

15. The computer readable medium of claim 11, wherein the computer program when executed further causes the computer to parse URLs in the landing page during deployment of said landing page.

\* \* \* \* \*